United States Patent
Kim et al.

(10) Patent No.: US 9,656,624 B2
(45) Date of Patent: May 23, 2017

(54) AIRBAG AND A PREPARATION METHOD THEREOF

(71) Applicant: KOLON INDUSTRIES, INC., Gyeonggi-do (KR)

(72) Inventors: Hyung-Keun Kim, Yongin-si (KR); Hee-Jun Kim, Yongin-si (KR); Dong-Jin Kwak, Yongin-si (KR); Sang Mok Lee, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/915,287

(22) PCT Filed: Sep. 3, 2014

(86) PCT No.: PCT/KR2014/008268
§ 371 (c)(1),
(2) Date: Feb. 29, 2016

(87) PCT Pub. No.: WO2015/034261
PCT Pub. Date: Mar. 12, 2015

(65) Prior Publication Data
US 2016/0207491 A1    Jul. 21, 2016

(30) Foreign Application Priority Data

Sep. 3, 2013 (KR) ........................ 10-2013-0105700

(51) Int. Cl.
*B60R 21/232* (2011.01)
*B60R 21/235* (2006.01)
(Continued)

(52) U.S. Cl.
CPC ............ *B60R 21/232* (2013.01); *B29C 65/08* (2013.01); *B60R 21/13* (2013.01); *B60R 21/213* (2013.01);
(Continued)

(58) Field of Classification Search
CPC ..... B60R 21/232; B60R 21/213; B60R 21/13; B60R 21/264; B60R 21/235;
(Continued)

(56) References Cited

U.S. PATENT DOCUMENTS 5,256,354 A * 10/1993 Chadwick ........... B29C 37/0057
264/119
5,989,660 A * 11/1999 Moriwaki ............. B60R 21/235
139/384 R (Continued)

FOREIGN PATENT DOCUMENTS

| JP | 2007-522985 A | 8/2007 |
| JP | 2010-241417 A | 10/2010 |

(Continued)

OTHER PUBLICATIONS

International Searching Authority, International Search Report for PCT/KR/2014/008268 dated Dec. 2, 2014 [PCT/ISA/210].

(Continued)

*Primary Examiner* — Darlene P Condra
(74) *Attorney, Agent, or Firm* — Sughrue Mion, PLLC

(57) ABSTRACT

The present invention relates to an airbag including an inflating part having gas inflatability, a non-inflating part supporting the inflating part, a combined part constituting a boundary between the inflating part and the non-inflating part, and an ultrasonic fusion bonded part located between the combined part and the end part of an inflator from which a gas at a high pressure spurts when a car crashes, and a preparation method thereof.

10 Claims, 2 Drawing Sheets

(51) Int. Cl.
    *B29C 65/08*     (2006.01)
    *B60R 21/13*     (2006.01)
    *B60R 21/213*     (2011.01)
    *B60R 21/264*     (2006.01)
    *B29L 31/30*     (2006.01)
    *B60R 21/00*     (2006.01)

(52) U.S. Cl.
    CPC .......... *B60R 21/235* (2013.01); *B60R 21/264* (2013.01); *B29L 2031/30* (2013.01); *B60R 2021/0006* (2013.01); *B60R 2021/0018* (2013.01); *B60R 2021/0032* (2013.01); *B60R 2021/2359* (2013.01); *B60R 2021/23509* (2013.01); *B60R 2021/23519* (2013.01)

(58) Field of Classification Search
    CPC .. B60R 2021/23519; B60R 2021/0032; B60R 2021/0006; B60R 2021/23509; B60R 2021/0018; B60R 2021/2359; B29C 65/08; B29L 2031/30
    See application file for complete search history.

(56) References Cited

U.S. PATENT DOCUMENTS

| | | | |
|---|---|---|---|
| 6,135,493 A | 10/2000 | Jost et al. | |
| 6,336,654 B1 | 1/2002 | Stein et al. | |
| 6,364,356 B1 * | 4/2002 | Keshavaraj | B29C 65/02 280/743.1 |
| 7,284,975 B2 * | 10/2007 | Morita | B26D 3/085 425/142 |
| 8,672,351 B2 | 3/2014 | Stevens | |
| 2002/0033592 A1 * | 3/2002 | Adkisson | B60R 21/231 280/743.1 |
| 2002/0067034 A1 | 6/2002 | Keshavaraj | |
| 2004/0100073 A1 | 5/2004 | Bakhsh et al. | |
| 2004/0130128 A1 | 7/2004 | Bakhsh et al. | |
| 2005/0090135 A1 * | 4/2005 | Schilson | B23K 20/106 439/164 |
| 2005/0134023 A1 * | 6/2005 | Cowelchuk | B60R 21/2165 280/728.3 |
| 2006/0208466 A1 | 9/2006 | Kirby | |
| 2011/0076479 A1 * | 3/2011 | Danielson | C09J 5/02 428/221 |
| 2014/0021705 A1 | 1/2014 | Youn et al. | |
| 2015/0191142 A1 * | 7/2015 | Youn | D03D 1/02 442/189 |

FOREIGN PATENT DOCUMENTS

| | | |
|---|---|---|
| JP | 2012-214114 A | 11/2012 |
| KR | 10-2003-0006986 A | 1/2003 |
| KR | 10-2009-0104533 A | 10/2009 |
| WO | 2012/134228 A2 | 10/2012 |

OTHER PUBLICATIONS

International Searching Authority, Written Opinion for PCT/KR/2014/008268 dated Dec. 2, 2014 [PCT/ISA/237].

Extended European Search Report issued Mar. 22, 2017 in corresponding European Application No. 14841717.3.

\* cited by examiner

ND A PREPARATION METHOD
AIRBAG AND A PREPARATION METHOD THEREOF

CROSS REFERENCE TO RELATED APPLICATIONS

This application is a National Stage of International Application No. PCT/KR2014/008268, filed on Sep. 3, 2014, which claims priority from Korean Patent Application No. 10-2013-0105700, filed on Sep. 3, 3013, the contents of all of which are incorporated herein by reference in their entirety.

TECHNICAL FIELD

The present invention relates to an airbag for preventing passengers from being wounded by a side window or structure of a car when the car turns over, and a preparation method thereof.

BACKGROUND OF THE INVENTION

Generally, an airbag is an apparatus for protecting a driver and passengers by providing a gas into the airbag by exploding gunpowder so as to inflate the airbag after detecting a crash impact with an impact detecting sensor, when a driving car collides head-on or side-on at a speed of about 40 km/h or more.

Recently, as interest in safety of passengers has risen along with functionality and convenience of a car, the current trend is an increase in the importance of safety devices which can protect the passengers from a car accident. Among the safety devices, particularly, the airbag system is used in company with a seat belt and functions to prevent the passenger from being injured when a car collides head-on or side-on. Furthermore, among the airbag systems, an airbag system particularly related to the side collision of a car is generally separately used as a curtain airbag for protecting a head part of the passenger and a side airbag for protecting a side part of the passenger. Here, the curtain airbag generally has a structure which is installed along the interior upper side of a car and is inflated like a curtain when a car collides, and the side airbag is installed in the door or the side of the seat and prevents the side part of the passenger from being injured due to direct bumping against the car body, including the door.

Particularly, a side-curtain-type airbag means an airbag installed at the side window or structure of a car for the purpose of preventing passengers from being wounded by the side window or structure when the car turns over. A common airbag installed at the front of a car can prevent passengers from receiving secondary shock by the airbag and can secure a driver's view only if it is quickly inflated by an explosive gas when the car crashes and the gas in the airbag is discharged in a short time. For this, most common airbags installed at the front of car have holes for discharging air. However, the side-curtain-type airbag is a means for protecting a passenger's head from the side window or structure of a car when the car turns over, and thus the side-curtain-type airbag must be inflated for supporting passenger's head safely for at least 6 seconds when the car turns over. For this, the gas should not leak more than needed from the seam part of the fabric of the airbag. Therefore, side-curtain-type airbags generally do not have holes for discharging air.

Therefore, a study for developing an airbag having excellent mechanical properties and inflating performance is needed, in order to achieve the internal pressure maintenance performance and the airbag inflating performance sufficiently to safely protect passengers from the accidents such as a car rollover, namely, in order to transfer the inflating gas to the airbag cushion effectively.

DETAILS OF THE INVENTION

Objects of the Invention

It is an aspect of the present invention to provide an airbag that is hardly ruptured by a gas at high temperature and high pressure spurted from an inflator and shows excellent internal pressure maintenance performance and inflating performance when a car crashes.

It is another aspect of the present invention to provide a preparation method of the airbag.

Means for Achieving the Object

The present invention provide an airbag, including an inflating part having gas inflatability, a non-inflating part supporting the inflating part, a combined part constituting a boundary between the inflating part and the non-inflating part, and an ultrasonic fusion bonded part located between the combined part and the end part of an inflator from which a gas at high pressure spurts when a car crashes.

The present invention also provides a preparation method of an airbag, including the steps of: preparing a double-layered fabric including an inflating part having gas inflatability, a non-inflating part supporting the inflating part, and a combined part constituting a boundary between the inflating part and the non-inflating part; and forming an ultrasonic fusion bonded part at the double-layered fabric between the combined part and the end part of an inflator from which a gas at a high pressure spurts when a car crashes.

Hereinafter, the airbag and the preparation method thereof are explained according to detailed embodiments of the present invention in more detail. However, they are merely presented as an example of the present invention, and thus it is to be clearly understood by a person skilled in the art that the scope of the present invention is not limited to the detailed embodiments and various modifications and executions are possible according to the embodiments within the scope of the present invention.

In addition, the term "include" or "comprise" means to include any components (or ingredients) without particular limitation unless there is no particular mention about them in this description, and it cannot be interpreted as a meaning of excluding an addition of other components (or ingredients).

By the experiments of the present inventors, it was revealed that the airbag can show excellent durability and mechanical properties and secure excellent inflating performance and improved stability when the airbag is operated, because an ultrasonic fusion bonded part is formed in the proximity of the combined part that is easily burst during preparation of the airbag so that the airbag has sufficient durability against the strong pressure of a momentary inflating situation at a high temperature and high pressure.

According to one embodiment of the invention, an airbag including the ultrasonic fusion bonded part having a certain characteristic is provided. The airbag includes an inflating part having gas inflatability, a non-inflating part supporting the inflating part, a combined part constituting a boundary between the inflating part and the non-inflating part, and an ultrasonic fusion bonded part located between the combined part and the end part of an inflator from which a gas at a high pressure spurts when a car crashes.

Particularly, the present invention is characterized in that the airbag shows excellent durability and mechanical properties and secures excellent inflating performance and improved stability when the airbag is operated because the ultrasonic fusion bonded part is formed in the proximity of the combined part.

The shortest distance between the ultrasonic fusion bonded part and the combined part may be 0.1 to 30 cm, preferably 0.5 to 25 cm, and more preferably 1 to 20 cm. The shortest distance may be 0.1 cm or more in the aspect of preventing the combined part from damage during the formation of the ultrasonic fusion bonded part, and it may be 30 cm or less in the aspect of improving the combined part protection function effectively when the airbag is inflated.

Furthermore, the width of the ultrasonic fusion bonded part may be 0.1 to 2 cm, preferably 0.15 to 1 cm, and more preferably 0.2 to 0.5 cm. The length of the ultrasonic fusion bonded part may be 1 to 30 cm, preferably 2 to 20 cm, and more preferably 3 to 15 cm. The width and the length may be 0.2 cm or more and 1 cm or more, respectively, in the aspect of improving the performance of protecting the combined part from the gas at a high temperature and high pressure spurted from the inflator when the car crashes. In addition, the width and the length may be 0.5 cm or less and 30 cm or less, respectively, in the aspect of preventing the fabric from damage during detachment during the effective inflating process in a rollover or car crash.

The ultrasonic fusion bonded part in the airbag of the present invention may have the shape of a full line, a dotted line, a curved line, a zigzag, an arrowhead, multiple lines, and so on, and it can be formed by variously mixing the shapes according to the shape of the combined part (seam) of the airbag. However, the shape of the ultrasonic fusion bonded part is preferably a curved line, a zigzag, an arrowhead, or multiple lines in the aspect of improving the combined part protection performance, and the shape is preferably a full line or a dotted line in the aspect of preventing the fabric from damage during detachment.

The bonding strength of the ultrasonic fusion bonded part, measured by the method of American Society for Testing and Materials (ASTM) D 1683, may be 5 to 50 kgf/inch, preferably 10 to 40 kgf/inchch, and more preferably 15 to 30 kgf/inch. The bonding strength of the ultrasonic fusion bonded part may be 5 kgf/inch or more in the aspect of improving the combined part protection effect, and it may be 50 kgf/inch or less in the aspect of preventing the fabric from damage during detachment.

Meanwhile, the combined part in the present invention means the part forming a boundary between the inflating part having gas inflatability and the non-inflating part supporting the inflating part, and it performs a role of preventing the air inflating the airbag from leaking out of the inflating part and enduring the pressure of the expanding gas when the airbag is inflated.

At first, the fabric for the airbag of the present invention may be a fabric prepared by a common weaving process. The fabric may include at least one fabric selected from the group consisting of a nylon-based fabric, a polyester-based fabric, a polyphenylene sulfide (PPS)-based fabric, and an aramid-based fabric. The present invention does not limit the kind of the fabric used, but nylon 66 fabric may be preferably used in the present invention by considering low air permeability, high strength, high thermal resistance, foldability, excellent tensile strength maintenance and heat aging resistance after a long time in a high temperature and humidity condition, and excellent self-extinguishability and energy absorbing property for preventing the secondary damage when the airbag is inflated, which are the required items of the fabric for an airbag. The fabric may further include additives such as an agent for improving thermal resistance, an anti-oxidant, a flame retardant, an anti-static agent, and so on by necessity.

Yarns of which total fineness is 210 to 840 denier, or preferably 315 to 525 denier, a number of filaments is 60 to 200, or preferably 60 to 150, tensile strength is 7.0 to 10.0 g/d, or preferably 8.2 to 9.5 g/d, and thermal shrinkage is about 6 to 7% may be used in the fabric for the airbag, but it is not limited to this.

The fabric for the airbag of the present invention may be prepared by beaming and weaving wefts and warps and scouring and tentering the same according to a common method. Particularly, the fabric may be a double-layered fabric in which two separate layers of fabrics which are simultaneously woven by a one piece weaving (OPW) method are partially co-woven by co-woven points. The double-layered fabric, namely, the fabric inflatable by a gas like air, has two separate layers of fabrics and co-woven points between the two layers of fabrics. The fabric has a system that is closed by the co-woven points, the co-woven points play a role of firmly combining the two layers when the fabric is rapidly inflated by air, and the gas should not leak at the part where the two layers are combined. For this reason, a 3×3 basket weave or a 2×2 basket weave may be mainly used for the weave of the co-woven part in the double-layered fabric. Furthermore, the non-inflating part that is delimited by the co-woven part is for supporting the inflating part, and thus the double-layered fabric where two separate layers centered on the co-woven point are maintained or the plain weave may be used as the non-inflating part.

The fabric for an airbag can resolve said problems by using a plain weave having high elongation resistance against external tension as the fabric layer and weaving the upper and lower fabric layers of the inflating part which are simultaneously woven with different weave structures. Preferably, the airtightness of the airbag can be increased by weaving the fabric with high density so that the cover factors, calculated by the following Calculation Formula 1, of the upper and lower fabric layers of the inflating part which are simultaneously woven, are 1900 or more, respectively. When the cover factor is less than 1900, there is a problem in that the air easily leaks out during the air inflation.

$$\text{Cover factor (CF)} = \text{warp density (thread/inch)} \times \sqrt{\text{warpdenier}} + \text{weft density (thread/inch)} \times \sqrt{\text{weftdenier}} \qquad \text{[Calculation Formula 1]}$$

Particularly, the weave density of the fabric for an airbag, namely, the warp density and the weft density, may be 80 th/inch or less or 40 to 80 th/inchch, preferably 75 th/inchch or less or 45 to 75 th/inch, and more preferably 72 th/inch or less or 49 to 72 th/inch, respectively. The weave density of the fabric layers of the inflating part may be 80 th/inch or less in the aspect of weaving production efficiency, and the warp fineness and the weft fineness may be 210 to 840 denier, or preferably 315 to 525 denier, respectively.

In addition, according to another embodiment of the present invention, a method of preparing the airbag is provided. The method includes the steps of preparing a double-layered fabric including an inflating part having gas inflatability, a non-inflating part supporting the inflating part, and a combined part constituting a boundary between the inflating part and the non-inflating part; and forming an ultrasonic fusion bonded part at the double-layered fabric between the combined part and the end part of an inflator from which a gas at a high pressure spurts when a car crashes.

In preparing the airbag of the present invention, the step of forming the ultrasonic fusion bonded part may be carried out by using ultrasonic waves of the frequency of 15 to 25 kHz. Preferably, the frequency of the ultrasonic waves may be 18 to 23 kHz, and more preferably, it may be 19 to 21 kHz. The frequency of the ultrasonic waves may be kHz or more in the aspect of improving the bonding strength of the ultrasonic fusion bonded part at the fabric for airbag, and it may be 25 kHz or less in the aspect of preventing the fabric from damage during detachment.

The step of forming the ultrasonic fusion bonded part may be carried out under the condition of the press pressure of 30 to 60 psi, preferably 35 to 55 psi, or more preferably 40 to 50 psi. The ultrasonic press pressure may be 30 psi or more in the aspect of giving sufficient bonding strength to the fusion bonded part, and it may be 60 psi or less in the aspect of preventing the fabric from damage during detachment.

The step of forming the ultrasonic fusion bonded part may be carried out for the fusion time of 0.25 to 6 seconds, preferably 0.5 to 5 seconds, or more preferably 0.75 to 4 seconds. The ultrasonic fusion time may be 0.25 seconds or more in the aspect of giving a sufficient bonding strength to the fusion bonded part, and it may be 6 seconds or less in the aspect of preventing the fabric from damage during detachment.

According to still another embodiment of the present invention, an airbag system including the airbag disclosed above is provided. The airbag system may be equipped with devices that are well known to the person skilled in the related art. The curtain airbag protects passengers when a car collides side-on or rolls over.

In the present invention, items besides those disclosed above can be added or subtracted with necessity and the present invention does not particularly limit them.

Effects of the Invention

According to the present invention, the durability of the combined part that is easy to burst when the airbag is inflated can be markedly improved by forming an ultrasonic fusion bonded part at a specific position of two separate fabric layers which are simultaneously woven by a one piece weaving method.

DETAILED DESCRIPTION OF THE EMBODIMENT

Hereinafter, preferable examples are presented for understanding the present invention. However, the following examples are only for illustrating the present invention, and the present invention is not limited to or by them.

EXAMPLES 1 To 4

Side-curtain-type airbags were prepared by a one piece weaving (OPW) method in a Jacquard loom, according to the conditions disclosed in the following Table 1.

Figure 1:
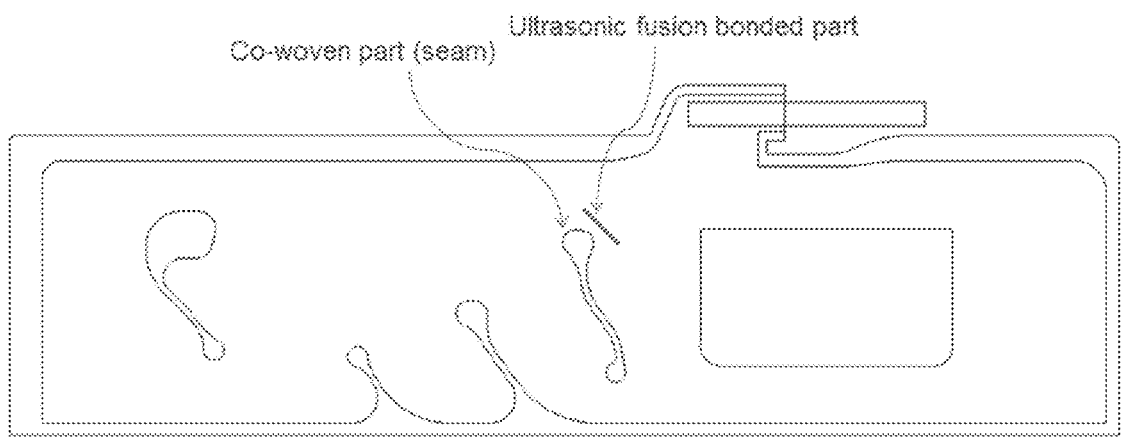
FIG. 1 is a schematic drawing showing the airbag cushion to which the ultrasonic fusion bonding is applied according to one embodiment of the present invention.

Particularly, ultrasonic fusion bonded parts were formed in the shape of a full line between the combined part and the end part of an inflator from which a gas at a high pressure spurts when a car crashes, as illustrated in FIG. 1.

COMPARATIVE EXAMPLE 1

A side-curtain-type airbag was prepared substantially according to the same method as in Example 1 by a one piece weaving (OPW) method in a Jacquard loom, except that separate ultrasonic fusion bonded parts were not formed, as disclosed in the following Table 1.

COMPARATIVE EXAMPLE 2

A side-curtain-type airbag was prepared substantially according to the same method as in Example 3 by a one piece weaving (OPW) method in a Jacquard loom, except that the warp fineness and the weft fineness were changed and separate ultrasonic fusion bonded parts were not formed, as disclosed in the following Table 1.

The properties of the airbags prepared according to Examples 1 to 4 and Comparative Examples 1 and 2 were measured by the following methods, and the results are listed in the following Table 1.

1) Evaluation on Internal Pressure

After preparing side-curtain-type car airbags by using the fabrics for an airbag prepared in Examples 1 to 4 and Comparative Examples 1 and 2, internal pressure maintenance performance of the airbag was measured by the following method at room temperature without separate aging.

Figure 2:
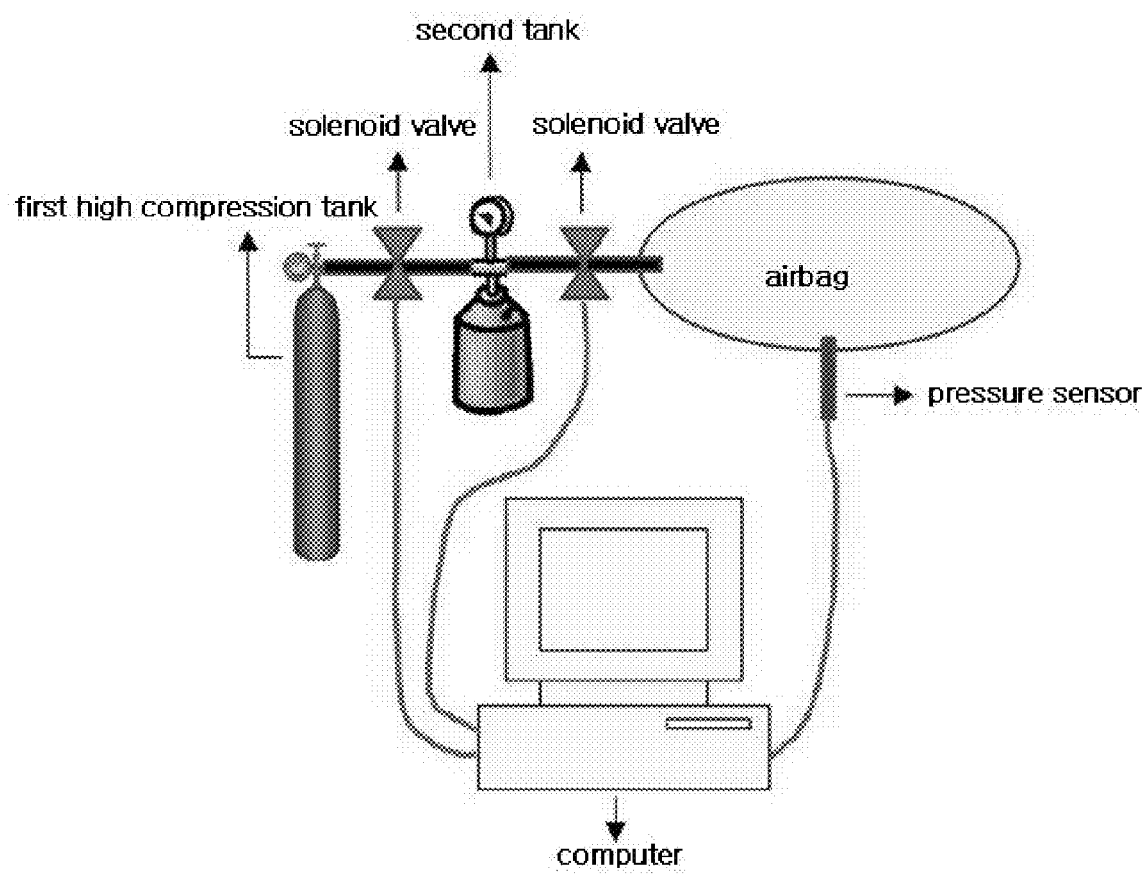
FIG. 2 is a schematic drawing showing a device for monitoring the internal pressure of the airbag according to one embodiment of the present invention.

As illustrated in FIG. 2, the airbag was inflated by instantaneously injecting compressed nitrogen gas at 16 bar into the airbag, and the change of the internal pressure of the airbag was observed by time. The maximum pressure when the gas was instantaneously injected and the internal pressure of the airbag after 6 seconds were measured, respectively.

2) Evaluation on Fusion Bonding

Whether fusion bonding was formed or not was evaluated by directly pulling the fusion bonded part. When the fused part was bonded as the combined part (seam), it was evaluated that fusion bonding was formed (expressed as "Yes"), and when the part was not bonded and was separated, it was evaluated that fusion bonding was not formed (expressed as "No").

3) Evaluation of Damage during Detachment

Damage during detachment was evaluated by optically observing the fusion bonded part. When a hole was formed at the detached part by damage, it was evaluated that damage occurred during the detachment (expressed as "Yes"), and when there was no hole, it was evaluated that no damage occurred during the detachment (expressed as "No").

4) Evaluation of Damage at Combined Part (Seam) of Cushion

Damage at the combined part (seam) of the cushion was evaluated by optically observing the combined part (seam) after the airbag was inflated. When the weave structure of the combined part (seam) was split or yarns in the weave structure were torn, it was evaluated that the damage occurred at the combined part (seam) of the cushion (expressed as "Yes"), and when there was no change in the weave structure from before the inflation, it was evaluated that no damage occurred at the combined part of the cushion (expressed as "No").

TABLE 1

| | Example 1 | Example 2 | Example 3 | Example 4 | Comparative Example 1 | Comparative Example 2 |
|---|---|---|---|---|---|---|
| Kind of yarn | Nylon | Nylon | PET | PET | Nylon | PET |
| Warp fineness (de) | 420 | 420 | 420 | 420 | 420 | 500 |
| Weft fineness (de) | 420 | 420 | 420 | 420 | 420 | 500 |
| Warp density (th/inch) | 57 | 57 | 57 | 57 | 57 | 57 |
| Weft density (th/inch) | 49 | 49 | 49 | 49 | 49 | 49 |
| Coated amount (gsm) | 75 | 75 | 75 | 75 | 75 | 75 |
| Ultrasonic fusion bonding condition — Pressure (psi) | 50 | 50 | 50 | 50 | — | — |
| Delay (sec) | 0.5 | 0.5 | 0.5 | 0.5 | — | — |
| Hold (sec) | 0.5 | 0.5 | 0.5 | 0.5 | — | — |
| Time (sec) | 0.75 | 1 | 0.5 | 1 | — | — |
| Bonding strength (kgf) | 26.29 | 24.07 | 10.38 | 13.12 | — | — |
| Internal Pressure ($N_2$ gas) — Max (kPa) | 59.6 | 56.6 | 64.8 | 64.7 | 56.6 | 66.7 |
| After 6 sec (kPa) | 52.5 | 44.7 | 49.0 | 47.7 | 38.6 | 32.5 |
| Fusion bonding | Yes | Yes | Yes | Yes | — | — |
| Damage during detachment | No | No | No | No | — | — |
| Damage at seam of cushion (Inflator) | No | No | No | No | Yes | Yes |

As shown in Table 1, in the airbags of Examples 1 to 4 according to the present invention, the ultrasonic fusion bonded part was effectively formed near the combined part that is easy to be damaged when the airbag is inflated by an inflator, and the fabrics were not damaged by the detachment of the fusion bonded part when the airbag was inflated. Furthermore, it is recognizable that the airbag of the present invention has excellent characteristics in that the combined part thereof is difficult to damage and thus the internal pressure of the cushion can be maintained for a long time, because the fusion bonded part protects the combined part, namely, the inflating air collides with the fusion bonded part before it collides with the combined part and the shock provided to the combined part is reduced when the airbag is inflated.

On the other hand, it was recognized that the airbags of Comparative Examples 1 and 2 to which the ultrasonic fusion bonding was not applied according to the existing method showed damage at the combined part when the airbags were inflated by an inflator. Therefore, there may be a problem in that the airbags cannot show sufficient internal pressure maintenance performance and airbag inflating performance to protect passengers safely from the accidents such as a car rollover.

The invention claimed is:

1. An airbag, including
an inflating part having gas inflatability, a non-inflating part supporting the inflating part, a combined part constituting a boundary between the inflating part and the non-inflating part, and an ultrasonic fusion bonded part located between the combined part and an end part of an inflator from which a gas at a high pressure spurts when a car crashes,
wherein a width of the ultrasonic fusion bonded part is 0.1 to 2 cm.

2. The airbag according to claim 1, wherein at least one fabric selected from the group consisting of a nylon-based fabric, a polyester-based fabric, a polyolefin-based fabric, and an aramid-based fabric is used in the airbag.

3. The airbag according to claim 1, wherein a fabric having a weave density of 80 yarns/inch or less is used in the airbag.

4. The airbag according to claim 1, wherein a fabric including yarns of which total fineness is 210 to 840 denier is used in the airbag.

5. The airbag according to claim 1, wherein a shortest distance between the ultrasonic fusion bonded part and the combined part is 0.1 to 30 cm.

6. The airbag according to claim 1, wherein a length of the ultrasonic fusion bonded part is 1 to 30 cm.

7. The airbag according to claim 1, wherein the ultrasonic fusion bonded part has a shape of a full line, a dotted line, a curved line, a zigzag, an arrowhead, or multiple lines.

8. A method of preparing an airbag, including steps of:
preparing a double-layered fabric including an inflating part having gas inflatability, a non-inflating part supporting the inflating part, and a combined part constituting a boundary between the inflating part and the non-inflating part; and
forming an ultrasonic fusion bonded part at the double-layered fabric between the combined part and the end part of an inflator from which a gas at a high pressure spurts when a car crashes,
wherein the step of forming the ultrasonic fusion bonded part is carried out by using ultrasonic waves at a frequency of 15 to 25 kHz.

9. The method of preparing an airbag according to claim 8, wherein the step of forming the ultrasonic fusion bonded part is carried out under a condition of a press pressure of 30 to 60 psi.

10. The method of preparing an airbag according to claim 8, wherein the step of forming the ultrasonic fusion bonded part is carried out for a fusion time of 0.25 to 6seconds.

\* \* \* \* \*